United States Patent Office 3,249,438
Patented May 3, 1966

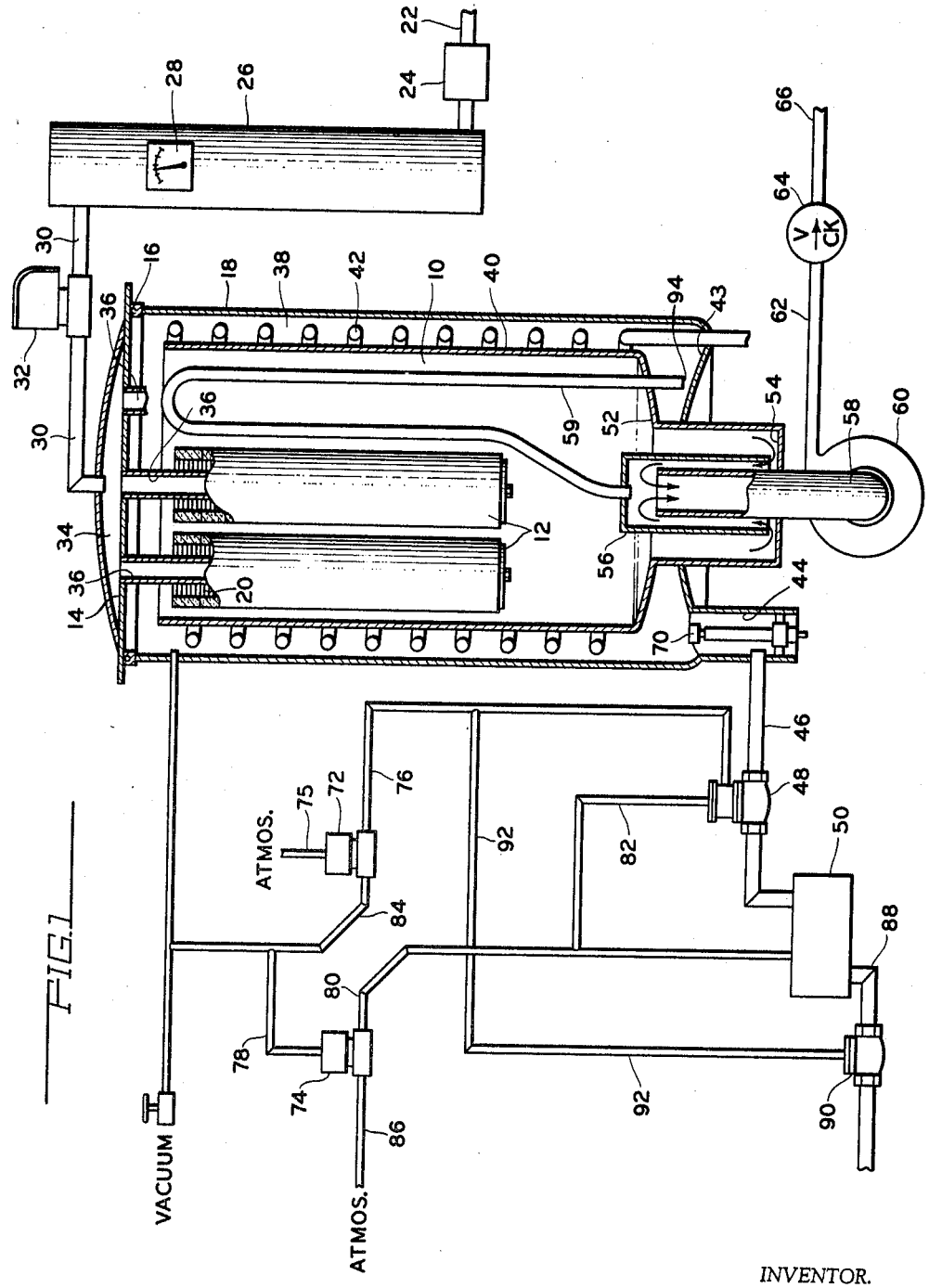

3,249,438
COMBINATION FILTER AND SEPARATOR UNIT
George J. Topol, 1557 Main St. W., Hamilton,
Ontario, Canada
Filed Jan. 2, 1962, Ser. No. 163,434
6 Claims. (Cl. 196—46.1)

This invention relates to a combination filter and separator apparatus for removing contaminants of various kinds from fluid materials such as oils or the like. The apparatus is useful for removing substantially all "non-wanted" contaminants such as dissolved air and gases, free and dissolved acids, and other solid contaminants.

It is essential, to the proper operation of many complex machines, to provide adequate lubrication which means that the lubricant is not only to be provided in proper amount, but also must be provided of a certain quality and purity. A contaminated lubricant can easily produce malfunctioning of the apparatus where inadequate lubrication is provided, especially in the case of accurately machined and corrosion-susceptible parts of a machine which can be readily deteriorated. It is obviously uneconomical to discard the fluid once it has picked up moisture, sludge, gases, acids and the like because the cost of lubricating would then become prohibitive. At the same time, it is uneconomical to shut down a machine for any period of time for purposes of cleaning the lubricant. For these reasons, it is essential to provide a mechanism which will provide continuously a contamination free quantity of lubricating material suitable in quality and purity level to provide lubricating functions and which preferably, will operate continuously and concurrently with other machine operations so that the lubricating material is constantly being reclaimed but without interference with the normal operation of the production machinery.

Accordingly, it is one of the primary objects of the present invention, to provide a continuously operable separator and filter which will constantly reclaim contaminated lubricating fluid, restoring such lubricating fuel to its original state of purity by removing contaminants of substantially all description, both free, dissolved, and emulsified, and which will operate continuously without interference with the normal operation of the production machinery.

It is a further object of the invention to provide a combination decontaminating and reclaiming device which will remove all "non-wanted" contaminant from natural and synthetic oil which are commonly found in lubricating, hydraulic, turbine, synthetic, insulating and vacuum pump operations to mention a few of the numerous applications.

Another object of the invention, is to provide an improved combination filter and separator apparatus in which the supply pump, concurrently provides for vacuum conditions within the unit in order to facilitate removal of liquid and gaseous phase contaminants thereby eliminating float valves and other moving parts which were previously used. In this respect, the invention provides novel features distinguishing it from my prior filed filter and separator unit disclosed in U.S. Patent No. 2,937,977, issued May 24, 1960.

A further object of the invention is to provide a combination filter and separator unit which constantly removes the oil or other fluid being decontaminated without maintaining at any one time substantial quantities of such fluid exposed to vacuum and flow within the apparatus. In this manner, I eliminate the possibility of excess foaming within the chamber.

A further object of the invention is to provide a continuously running, self-regulating apparatus which operates continuously to decontaminate the fluid, automatically receiving and returning the lubricating fluid to the system in a condition of high purity for optimum lubricating operation and the impurities are automatically removed and conducted away from the apparatus for discard.

Unlike previously used apparatus of the type described, I do not utilize high pressure cooling water or other liquid means under pressure other than the purified liquid which is returned to the intended use under pressure.

It is a further object of the invention to provide a novel discharge means for the condensate contaminant which is removed continuously by means of self-regulating electro-mechanical devices.

A combination filter and separator unit of the type described has numerous applications, and a few of these applications, which are mentioned only as illustrative of the invention, can be listed as follows: The invention is usable in steel mills for lubrication systems using high viscosity oils which are heavily emulsified; paper mill applications for lubricating systems in which there are generated very tight emulsions of water and oil in circulating oil systems for paper machines; the invention is usable in hydraulic oil systems; turbines, both stationary and marine; general and electrical industries for insulating oils in which it is necessary to maintain a high dielectric strength in the insulating oils, this to be accomplished by the removal of air, dissolved gases, acids, sludges and the like; and, vacuum pumps, for removal of condensate and contaminants from vacuum pump oils.

Other objects and features of the invention will become apparent from a consideration of the following description, which proceeds with reference to the accompanying drawing, wherein:

The single figure is a side elevation view of the apparatus, shown partly in section to illustrate the interior of the combination filter and separator chamber.

There is suspended within chamber 10 a plurality of cylindrical filter elements 12 which are supported from an element holder 14 which is a cover plate fitting over the sealed end 16 of the outer cylinder 18. The filter units are chemically inert and their specific construction does not form a part of the present invention but typically, filter units include a stack of discs 20 which are of fiber glass construction mounted within a resin such as a phenol formaldehyde thermosetting resin compressed during curing of the resin so that the fiber glass is held or maintained in a compressed or predensified state by the polymerized resin. The cartridge can of course be made of different lengths and the preferred form is to stack the discs freely on a mandrel to a free length of approximately 24 inches or so.

The contaminated fluid which is intended for cleaning, is introduced to the system through inlet line 22 having a line strainer 24 and heater 26, including a thermostat 28 which is used for a protection against overheating of the oil. The function of the heater is to supply a sufficient heat to the oil required for volatilizing moisture which is included with the oil as a contaminant thereof. From the heater 26 the oil is passed through a line 30 having a solenoid valve 32 which controls the rate of inflow of oil through line 30 into chamber 34 which then leads to conduit 36 providing inlets to the filter elements 12.

As the oil passes through the filter elements these chemically inert structures perform the multiple functions of (1) removing solid particle contaminants, (2) the filter elements initiate and accelerate removal of emulsified and dissolved water by coalescing said water at the outer surface of the filter element, the filter elements distribute the oil in thin layers over a relatively large surface area thereby removing vapor phase contaminants, and also removing gaseous phase contaminants in the form of air and other gases which are free and dissolved. The filter elements impede the progress of water droplets and therefore extend the exposure time producing the effect of improving heat transfer between the oil and water droplets with the result that the water droplets are exposed to a flow of fresh heated oil.

It has been found, that in order to vaporize coalesced water which collects at the outer surface of the filter elements 12 it is necessary to maintain subatmospheric pressure within the chamber 10, and for that reason, there is provided during all phases of operation, a vacuum condition within the chamber 10 whereby volatilizible contaminant is first removed from the oil, collecting on the surface of the filter elements 12, and than passing within the annular chamber 38 provided between cylinder 18 and cylinder 40 where cooling coils 42 condense the contaminant which then collects at the bottom 43 of cylinder 18 and drains into a well 44 having an outlet 46 leading through a valve 48 to a condensate tank 50. The filtered fluid in turn reaches the bottom 52 of the vessel 40 drains within a well 54 then passes upwardly within an inverted vessel 56 then reverses flow to pass downwardly through a supply line 58 to a pump 60 having a discharge line 62 controlled by check valve 64 and through line 66. The oil is in this manner returned for reuse within the system in a decontaminated condition. The capacity of the pump 60 is such that it is three times higher than the oil flow provided by the solenoid valve 32 which means that as quickly as the oil passes through the filter elements 12 it is removed from the filter-separator unit and therefore since it does not collect within the unit the incidence of foaming is substantially reduced. Also, the increased capacity of the pump 60 produces a vacuum effect within the interior of the vessel 10 and it is the action of this vacuum which promotes volatilization of liquid phase contaminant which collects at the surface of the filter elements 12, as well as any gases in the form of air and the like.

The vacuum does not, however, remove any of the volatilized vapors, only the non-condensable gases such as air. This is accomplished because the volatilized gases which are evaporated off of the surface of the filter units 12 are passed downwardly within the chamber 38 and are condensed by the cooling coils 42 by the time they reach the bottom of the chamber 38, and will not therefore be drawn through line 59 which terminates closely adjacent the bottom of the chamber 38 thus withdrawing only non-condensable gases such as air and low boiling point contaminant materials.

So long as the condensate tank 50 is not filled, the operation will continue to collect condensate contaminant and drain it off through line 46 to the tank 50 but once the tank is filled and the condensate level reaches electrode 70 there is initiated a draining cycle by completing an electrical circuit which operates relays (not shown) effecting energization of solenoid valves 72 and 74 which normally connect line 75 with line 76, and line 78 with line 80 with the result being that vacuum is communicated through line 80 to the tank 50 permitting filling thereof. When the solenoid valves 72, 74 are operated, the vacuum line 80 is connected through branch line 82 with one side of a diaphragm (not shown) and valve 48 on the opposite side of said diaphragm is connected through line 76 with atmospheric pressure through line 76; thus, the inlet valve is normally open. When the electrode 70 is energized owing to the filling of the tank 50, the solenoids 72 and 74 are operated so that line 76 is connected with line 84 which is a vacuum line, and solenoid valve 74 then connects line 80 which was previously connected to vacuum, with a pressure line 86 thereby subjecting the tank 50 to atmospheric pressure through line 86 and line 80, to cause the discharge of condensate from tank 50 through line 88 and past the outlet valve 90 which, during discharge operation, is connected through lines 92, 76 to vacuum during discharge operation. Once the tank 50 is emptied (the total discharge operation lasting in the order of about 60 seconds or so) the solenoid valves 72 and 74 are again operated so that line 92 is connected to atmospheric pressure through 75, thereby closing the outlet valve, and lines 80, 76 are returned respectively to vacuum and atmospheric pressure In this way the inlet valve 48 opens communication of line 46 again with the tank 50 to resume drainage of well 44 to the tank 50.

After 60 seconds, which is ample time for draining the tank 50, the relay will serve to keep the electrode de-energized. The reason for this additional delay is to allow time for fluid in 44 to drain to the tank 50. Without the 10 second delay the shorted electrode (flooded with fluid at this time) would immediately reopen the valve 90 and close valve 48. Therefore, little or no condensate could pass through valve 48 into the tank 50.

In operation, a continuous flow of contaminated fluid is provided through inlet line 22, through heater 26, line 30, and chamber 34 and passes through the filter elements 12 which collect solid phase contaminants at the interior of the filter elements. As the fluid passes through the filter elements entrained liquid phase material such as dissolved and emulsified water is coalesced and collects at the surface of the filter elements 12 and since the fluid is spread throughout a relatively large area, gaseous phase material is expelled from the liquid particularly under the conditions of vacuum which exist within the interior of the chamber 10. The decontaminated fluid collects continuously at the bottom 52, drains within well 54 and then by a reverse flow operation passes to the pump 60 where it is discharged through line 62 past check valve 64 and line 66 where it is returned for reuse. The pump 60 in addition to a positive pressure return pump, also produces a vacuum within chamber 10 and is a vacuum sealed pump. Moreover, the capacity of the pump is such that when compared with the rate of inlet from the solenoid valve 32 there is an induced flow from the inlet line 22 by virtue of the vacuum developed within chamber 10 by the pump 60, therefore, only a single pump is required which performs the function of inlet flow means, vacuum producing means, and return flow means for the fluid.

The liquid phase material which is coalesced at the outer surface of the filter elements 12 vaporizes and at least some of it passes within chamber 38. The described vaporization occurs because of the combined factors of exposure to the hot fluid and also because of the sub-atmospheric pressure. When the vaporized contaminant reaches the cooling coils 42 it is condensed and collects at the bottom 43 of the cylinder 18. The condensate is removed before reaching the end 94 of line 59 so that none of it is withdrawn by the pump 60, only non-condensible gases such as air and the like is removed through line 59 by the pump 60. The condensed contaminant fluid collects within the well or sump 44 and passes freely through line 46 past solenoid control inlet valve 48 to condensate tank 50, until condensate tank 50 is filled and then electrode 70 is energized when the sump 44 is filled, actuating a relay (not shown) which in turn actuates solenoid control valves 72, 74 which reverses the operation of the inlet valve, closing communication of line 46 with the tank 50 and opening the outlet valve 90 to provide for a drainage of the fluid from tank 50 but without exposing the vacuum within chamber 38 to atmosphere.

When the electrode is energized the tank 50 is emptied within the 60 second period provided and before the valve 90 is again closed by timer operation. After the draining cycle is completed the relay closes valve 90 after a delay of 10 additional seconds, giving the condensate an opportunity to drain from 44 to 50 and uncovers the shorted electrode 70 so that it (the electrode) will be prevented from immediately reopening 90 and closing 48 which would be the case if there were no delay. Each time the electrode 70 is energized there is discharged a fixed quantity of condensate from the tank 50; hence, a counter will correlate the amount of contaminant for a given period, or, for a given quantity of liquid passing through the apparatus if information of this type is desired.

The operation as described, continues without interruption, and without any interference with the mechanism which requires a constant supply of decontaminated fluid and, therefore, none of the processes of decontamination interferes with or requires down period of the mechanism.

Also, the cooling coil 42, being in proximity with the inner vessel 40 rather than the outer vessel 18 does not cause a moisture from the atmosphere to condense on the outer surface of the vessel 18, this being a substantial improvement. It will be further noted, that as the decontaminated fluid collects at the bottom of the vessel 40 it is removed, and the absence of collected decontaminated fluid at the bottom of the container reduces the incidence of foaming by a considerable amount. The pump 60, combining as it does several functions of providing inlet impulse to the fluid, providing outlet pressure for return of the decontaminated fluid, and development of vacuum within the chamber, provides considerable economy in operation because of this multiplicity of functions in a single unit.

The pump 60 and the heater 26 may be electrically connected if desired so that one cannot operate without the other. In other words, it is provided that heating of the fluid cannot occur without operation of the pump. Another important advantage of the present invention is that the cooling system does not require water under any considerable pressure. The water is simply inletted through the end series one of coils 42 and the rate of fluid flow is a function of the size of the unit and the temperature of the water. The pump 60 and solenoid valve 32 may be electrically connected so that valve 32 will close automatiaclly when the pump 60 stops. In this way, the inflow of oil is terminated when the pump 60 stops operation and therefore the apparatus is prevented from filling with oil because of inoperativeness of the pump 60.

Although the present invention has been illustrated and disclosed in connection with the single example embodiment, it will be understood that this is illustrative of the invention and is in no sense restrictive thereof. It is reasonably to be expected that those skilled in the art can make numerous revisions and adaptations of this invention to suit individual design requirements and it is intended that such revisions and adaptations as incorporate the herein disclosed principles, will be included within the scope of the following claims as equivalents of the invention.

I claim:

1. A combination filter and water separator for decontaminating sealing oil, and the like, comprising means providing an inlet flow of sealing oil for decontamination, vacuum chamber means for receiving said inlet flow of oil, filter means having surfaces exposed to the vacuum within said vacuum chamber and disposed within said vacuum chamber for distributing the flow of oil over a substantial surface area for removing both solid particle contaminants and for facilitating removal of moisture, a pump means having an inlet connection means adjacent the lower portion of said vacuum chamber and a discharge connection including valve means, said pump means producing subatmospheric pressure within said chamber concurrently with effecting liquid flow from said vacuum chamber, means defining a second chamber surrounding said vacuum chamber and having access therebetween for providing flow of volatilized moisture from said vacuum chamber into said second chamber, cooling means combined with said second chamber for condensing vapor phase moisture contaminants from said oil, and means for periodically withdrawing said condensed moisture contaminants while maintaining conditions of subatmospheric pressure within said vacuum chamber.

2. Apparatus for continuously removing contaminants from oil material, and the like, comprising means for conducting a flow of contaminated oil material to said apparatus for cleaning, means defining a first chamber having a filter element with surfaces thereof exposed to subatmospheric pressure and through which incoming contaminated oil is passed before entering said first chamber, a pump for receiving the oil contained within said first chamber and having a pumping capacity which provides continuous withdrawal of said oil and simultaneously imposes subatmospheric pressure within said first chamber to facilitate removal of gaseous phase and liquid phase contaminants within said oil, means defining a second chamber surrounding said first chamber and having an access connection with said first chamber, cooling means combined with said second chamber for condensing vaporized contaminants of said oil within said second chamber, and means for automatically draining condensed contaminant material collected within said second chamber.

3. A combination filter and separator apparatus for decontaminating oil materials, and the like, comprising means for supplying to said separator a quantity of contaminated oil material for cleaning, a first chamber having a filter element with surfaces thereof exposed to subatmospheric pressure and through which contaminated liquid is drawn to effect removal of contaminants therein, a pump means having a fluid connection adjacent the lower portion of said first chamber, a discharge line for receiving a flow from said pump and having a control valve therein, said pump means effecting a continuous withdrawal of filtered liquid from said first chamber and imposing simultaneously a subatmospheric pressure within said first chamber, thereby facilitating removal of vaporizable contaminants within said oil as it is exposed to subatmospheric pressure at the surface of said filter element, means defining a second chamber for receiving the vaporized fluid phase contaminants removed from said oil material, means forming access passages between said first and second chambers for conducting vaporized liquid phase contaminants which is separated from the filtered oil within said first chamber and conducting such vaporized contaminants to said second chamber, and means within said second chamber for condensing such vaporized contaminants in separated relation from said filtered oil.

4. A combination filter and separator apparatus in accordance with claim 3, wherein said second chamber is disposed concentrically with said first chamber and condenser means disposed within said second chamber to effect cooling and condensation of vaporized liquid phase contaminants which are conducted from said first chamber to said second chamber and are condensed in said second chamber.

5. A combination filter and separator for liquid materials comprising means defining a chamber having at least one filter unit exposed to subatmospheric pressure within said chamber and through which contaminated fluid is passed before entering said chamber, pump operatively connected to said chamber adjacent its lower portion for withdrawing a flow of filtered fluid from said chamber, and an outlet line for receiving the flow from said pump and including a check valve therein to provide one-way flow of fluid through said line, said pump having a pumping capacity for withdrawing liquid and also for exhausting air within said chamber, means for collecting contaminants which are volatilized within said chamber and disposed in separated relation from said chamber having fluid material therein which has been passed through said filter, and means for regulating the operation of said intermittently removing means for withdrawing the condensed material within said collecting means.

6. A combination filter and separator apparatus in accordance with claim 5, including means for sensing the quantity of condensed material within said collecting means, and means responsive to said sensing means for effecting removal of such condensed material within said collecting means.

References Cited by the Examiner

UNITED STATES PATENTS

| | | | |
|---|---|---|---|
| 2,297,098 | 9/1942 | Carney | 202—160 |
| 2,937,977 | 5/1960 | Topol | 196—46.1 |

SAMIH N. ZAHARNA, *Primary Examiner.*

REUBEN FRIEDMAN, FRANK W. LUTTER,
*Examiners.*

D. M. RIESS, *Assistant Examiner.*